(12) United States Patent
Hannemann et al.

(10) Patent No.: US 8,889,000 B2
(45) Date of Patent: Nov. 18, 2014

(54) APPARATUS, METHODS, AND SYSTEM FOR TREATMENT OF STORMWATER AND WASTE FLUIDS

(75) Inventors: William Robert Hannemann, Ocean Gate, NJ (US); Albert Mayer Cohen, West Long Branch, NJ (US)

(73) Assignee: Storm Drain Technologies, LLC, Ocean, NJ (US)

( * ) Notice: Subject to any disclaimer, the term of this patent is extended or adjusted under 35 U.S.C. 154(b) by 374 days.

(21) Appl. No.: 13/234,019

(22) Filed: Sep. 15, 2011

(65) Prior Publication Data
US 2013/0068679 A1 Mar. 21, 2013

(51) Int. Cl.
*E03F 5/14* (2006.01)
*E03F 5/16* (2006.01)
*B01D 17/02* (2006.01)
*B01D 21/00* (2006.01)
*C02F 1/40* (2006.01)
*C02F 103/00* (2006.01)

(52) U.S. Cl.
CPC ............... *E03F 5/16* (2013.01); *B01D 17/0211* (2013.01); *E03F 5/14* (2013.01); *B01D 21/0042* (2013.01); *C02F 1/40* (2013.01); *C02F 2103/001* (2013.01); *C02F 2303/24* (2013.01)
USPC ...... 210/170.03; 210/305; 210/307; 210/521; 210/532.1; 210/538

(58) Field of Classification Search
CPC .......... E03F 5/14; E03F 5/16; B01D 17/0211; B01D 21/0042; B01D 21/02; B01D 21/2444; B01D 36/04; C02F 1/40; C02F 2101/32; C02F 2103/001; C02F 2303/24
USPC ......... 210/170.03, 299, 305, 307, 521, 532.1, 210/538, 540, 747.2, 747.3
See application file for complete search history.

(56) References Cited

U.S. PATENT DOCUMENTS

| | | | |
|---|---|---|---|
| 4,261,823 A | 4/1981 | Gallagher et al. | |
| 4,501,446 A | 2/1985 | Glaser et al. | |
| 4,994,179 A | * 2/1991 | Keeter et al. | 210/540 |
| 5,322,629 A | 6/1994 | Stewart | |

(Continued)

OTHER PUBLICATIONS

Patent Cooperation Treaty Written Opinion of the International Searching Authority for PCT/US2012/055665, Mar. 7, 2013, 6 pgs.

(Continued)

*Primary Examiner* — Christopher Upton
(74) *Attorney, Agent, or Firm* — Peter J. Meza; Theodore J. Mlynar; Hogan Lovells US LLP

(57) ABSTRACT

A stormwater treatment unit comprising a containment vault having an inlet and an outlet separates debris from a flow of stormwater through the unit. The water flow is controlled by a wall which directs flow from the inlet to the outlet through a reservoir of fluid in the unit. Debris separation by density occurs whereby lighter elements such as oil float on top of the fluid and heavier elements such as sediment collect at the bottom of the unit or in collectors in the reservoir. A wire mesh, deflector, and/or ripple boards placed beneath the inlet further increase efficiency of the separation, and a vent pipe is placed above the outlet to release pressure built up in the outlet during operation. A stormwater treatment system and method of retrofitting an existing stormwater trunk line locates the stormwater treatment unit in an off-line position from an existing drainage trunk line.

26 Claims, 6 Drawing Sheets

(56) References Cited

U.S. PATENT DOCUMENTS

| | | | |
|---|---|---|---|
| 5,405,539 | A | 4/1995 | Schneider |
| 5,423,986 | A * | 6/1995 | Valentin .................. 210/540 |
| 5,489,383 | A | 2/1996 | Yoshikawa |
| 5,520,825 | A | 5/1996 | Rice |
| 5,961,827 | A | 10/1999 | Bahr |
| 6,063,296 | A | 5/2000 | Ackerman et al. |
| 6,076,702 | A | 6/2000 | Hoffmann et al. |
| 6,120,684 | A | 9/2000 | Kistner et al. |
| 6,126,817 | A * | 10/2000 | Duran et al. .............. 210/532.1 |
| 6,190,545 | B1 | 2/2001 | Williamson |
| 6,258,268 | B1 | 7/2001 | Lake |
| 6,270,663 | B1 | 8/2001 | Happel |
| 6,305,845 | B1 | 10/2001 | Navin |
| 6,350,374 | B1 | 2/2002 | Stever et al. |
| 6,379,547 | B1 | 4/2002 | Larsson |
| 6,401,983 | B1 | 6/2002 | McDonald et al. |
| 6,428,692 | B2 | 8/2002 | Happel |
| 6,547,962 | B2 | 4/2003 | Kistner et al. |
| 6,783,683 | B2 * | 8/2004 | Collings .................. 210/170.03 |
| 6,869,525 | B1 | 3/2005 | Happel |
| 6,911,145 | B2 | 6/2005 | Hutchinson et al. |
| 6,936,163 | B2 | 8/2005 | Use et al. |
| 6,955,756 | B2 | 10/2005 | Fallon |
| 6,994,783 | B2 | 2/2006 | Use et al. |
| 7,001,514 | B1 * | 2/2006 | Liao .................. 210/532.2 |
| 7,011,743 | B2 | 3/2006 | Use et al. |
| 7,022,243 | B2 | 4/2006 | Bryant |
| 7,025,887 | B1 | 4/2006 | Kirts et al. |
| 7,045,068 | B2 | 5/2006 | Hutchinson et al. |
| 7,153,417 | B2 | 12/2006 | Happel |
| 7,160,444 | B2 | 1/2007 | Peters, Jr. et al. |
| 7,160,465 | B2 | 1/2007 | Kirts et al. |
| 7,258,785 | B2 | 8/2007 | Weir et al. |
| 7,270,747 | B2 | 9/2007 | Happel et al. |
| 7,294,256 | B2 | 11/2007 | Happel et al. |
| 7,311,818 | B1 * | 12/2007 | Gurfinkel .................. 210/521 |
| 7,410,576 | B2 | 8/2008 | Brouillard et al. |
| 7,455,780 | B1 | 11/2008 | Joyner et al. |
| 7,504,028 | B1 | 3/2009 | Gurfinkel |
| 7,638,065 | B2 | 12/2009 | Stever et al. |
| 7,662,296 | B2 | 2/2010 | Pancaldi et al. |
| D620,548 | S | 7/2010 | Vreeland |
| 7,780,855 | B2 * | 8/2010 | Eberly .................. 210/747.3 |
| 7,815,800 | B2 | 10/2010 | Komatsu |
| 7,819,269 | B2 | 10/2010 | Perkins |
| 7,846,327 | B2 | 12/2010 | Happel et al. |
| 7,857,966 | B2 | 12/2010 | Duran et al. |
| 7,891,914 | B2 | 2/2011 | Smallwood et al. |
| 7,892,425 | B2 | 2/2011 | Generes et al. |
| 7,972,408 | B2 | 7/2011 | Bruso et al. |
| 8,070,960 | B2 | 12/2011 | Conwell |
| 2003/0121846 | A1 | 7/2003 | Use et al. |
| 2003/0121850 | A1 | 7/2003 | Use et al. |
| 2004/0222159 | A1 | 11/2004 | Peters, Jr. et al. |
| 2004/0226869 | A1 | 11/2004 | McClure et al. |
| 2005/0072718 | A1 | 4/2005 | Lacy et al. |
| 2005/0072738 | A1 | 4/2005 | Weir |
| 2005/0184007 | A1 | 8/2005 | Allard et al. |
| 2006/0006125 | A1 | 1/2006 | Tolmie et al. |
| 2006/0032809 | A1 | 2/2006 | Shaw et al. |
| 2007/0215533 | A1 | 9/2007 | Tittgen |
| 2007/0256966 | A1 * | 11/2007 | Siviter et al. .............. 210/170.03 |
| 2008/0023074 | A1 | 1/2008 | Uemura et al. |
| 2009/0166279 | A1 | 7/2009 | Happel et al. |
| 2009/0200216 | A1 | 8/2009 | Robinson et al. |
| 2010/0078370 | A1 | 4/2010 | Happel |
| 2010/0181237 | A1 * | 7/2010 | Duran et al. .............. 210/170.03 |
| 2012/0312755 | A1 | 12/2012 | Ryan et al. |
| 2013/0068679 | A1 | 3/2013 | Hannemann et al. |
| 2013/0068699 | A1 * | 3/2013 | Hannemann et al. ...... 210/747.2 |

OTHER PUBLICATIONS

Patent Cooperation Treaty Notification of Transmittal of the International Search Report and the Written Opinion of the International Searching Authority, or the Declaration for PCT/US2012/055665, Mar. 7, 2013, 5 pgs.

Notice issued by the State of New Jersey Department of Environmental Protection regarding Stormwater Construction Permits Request for Authorization, dated Oct. 1, 2009, 2 pgs.

Industry Problems Overview. 9 pgs., date not available.

Dandy Dewatering Bag Pumped Water Sediment Control System Guide Specifications, 11 pgs., date not available.

Sand Media Filter 60-4SK specification sheet, Rain for Rent, 1 pg., date not available.

Phoenix Portable Dewatering Systems specification sheet, Phoenix Process Equipment Company, 1 pg., date not available.

Water-Based Drilling Fluid Dewatering Polymers specification sheet, KEMTRON Technologies, Inc., published in 2009, 4 pgs.

Roll-Off Sludge Container with Dewatering Shell specification sheet, Wastequip, published in Jul. 2010, 2 pgs.

DW500 Dewatering Aerator specification sheet, ESD Waste2Water, Inc., published Jun. 18, 2008, 1 pg.

Griffin Dewatering Corporation specification sheet, 2 pgs., date not available.

Moos KSA specification sheet, Simon Moos Maskinfabrik a/s, 8 pgs., date not available.

Moos Lime Stabilization Unit specification sheet, Simon Moos Maskinfabrik a/s, 4 pgs., date not available.

MDU AquaTeqs Mobile Dewatering Unit specification sheet, AquaTeq Sweden AB, 2 pgs., date not available.

Mobile Dewatering Plant specification sheet, DEWA Water & Energy, 2 pgs., date not available.

SecCatch Dewatering Bag/Tube specification sheet, SedCatch, 2 pgs., date not available.

Erosion Control Products specification sheet, Granite Environmental, 1 pg., date not available.

Dewatering Pumps Synopsis specification sheet, Storm Drain Technologies, LLC, 1 pg., date not available.

SecCatch 10 oz Dewatering Bag/Tube specification sheet, SedCatch, 2 pgs., date not available.

Mirafi Dewatering Bag for Stormwater Sediment Control specification sheet, Tencate, 2 pgs., date not available.

Ultratech—Dewatering Bag specification sheet, Interstate Products, Inc., 1 pg., date not available.

* cited by examiner

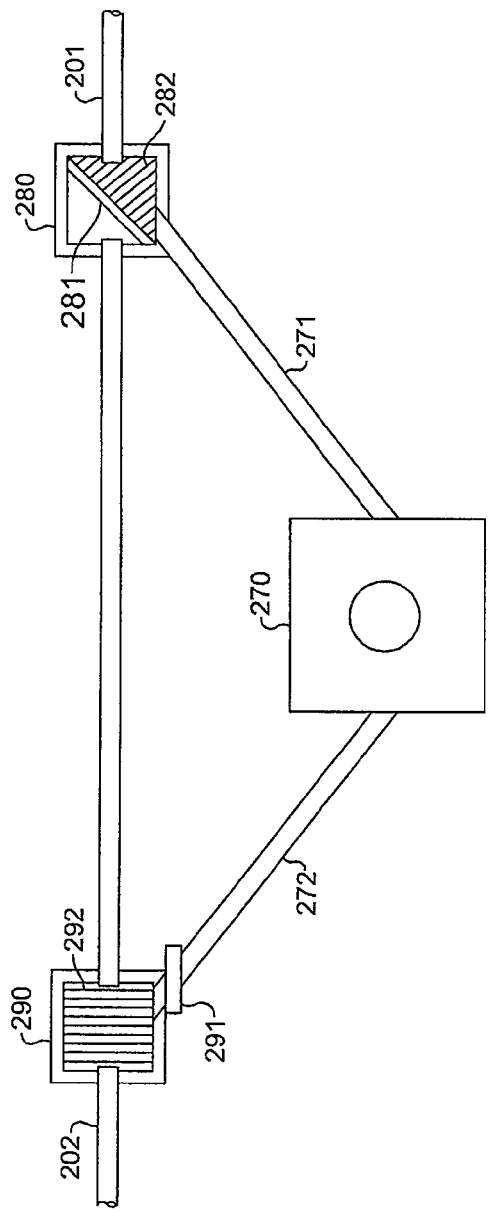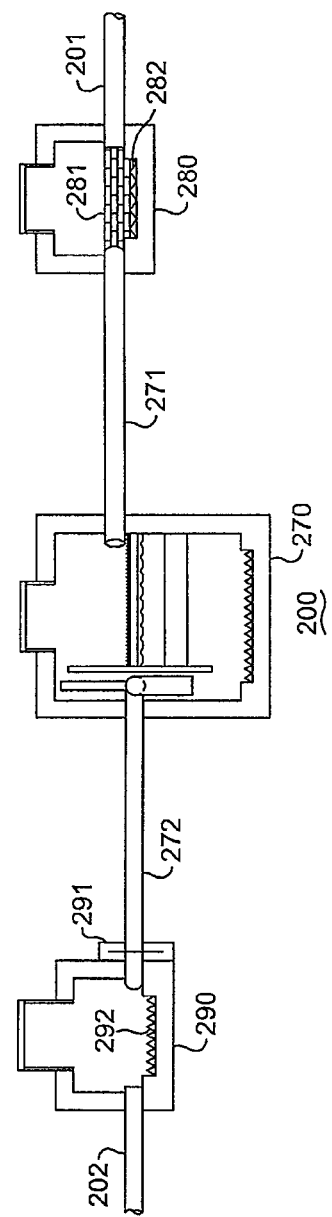
Fig. 2A
Fig. 2B

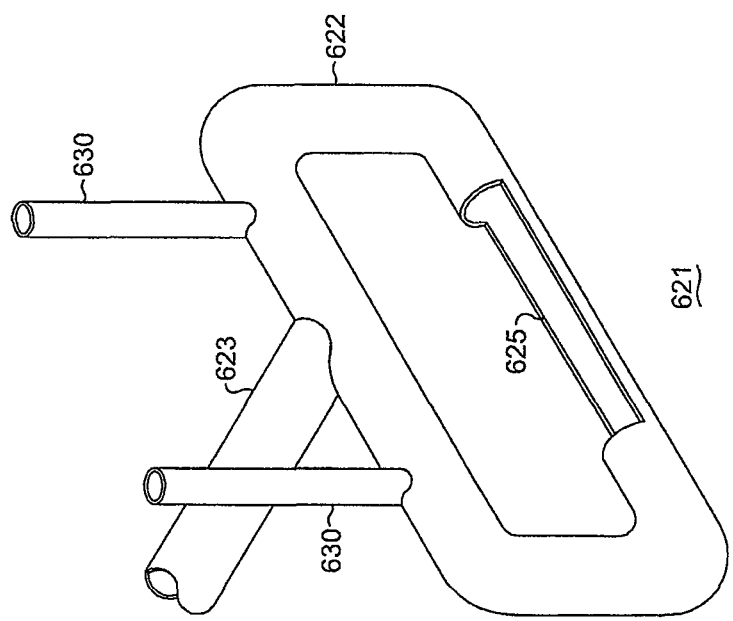

APPARATUS, METHODS, AND SYSTEM FOR TREATMENT OF STORMWATER AND WASTE FLUIDS

BACKGROUND OF THE INVENTION

1. Field of the Invention

The present invention generally relates to apparatus, methods, and systems for treating stormwater, and, more particularly, to separating sand, oil, biomass, and other debris from water and reducing the amount of nutrients and nitrogen compounds in treated stormwater. More broadly, the present invention relates to apparatus, methods, and systems for treating high volumes of liquids, mixtures, suspensions and the like to separate them into constituent parts.

2. Relevant Background

Modern storm drainage systems involve directing stormwater to storm or sewer drains where the water is collected for later processing and disposal or simply discharged into larger bodies of water. In those systems, stormwater is guided to flow from slopes and streets into the storm drains by the force of gravity. During that flow, stormwater may pick up debris, trash (e.g., paper, cans, and cigarette butts), biomass (e.g., grass, leaves, excrement and discarded food), silt, sand, stone, oil, pollutants, heavy metals, and discarded medical devices and personal products (e.g., used needles and condoms) and other particles. Further, the storm drainage systems may also collect other run-off water such as water used for irrigation. Stormwater and run-off water may naturally flow through soil or other terrains and pick up organic matter or chemicals, such as plants, leaves, hydrocarbons, nitrates, or other compounds.

There is a great deal of interest in effectively processing stormwater. Drainage systems usually flow into natural water systems, such as oceans, lakes, rivers, streams, and other similar bodies of water. It would help protect the environment if there was a realistic, cost-effective capability to separate out man-made and natural contaminants and pollutants before the drainage is directed into the natural water systems and avoid upsetting the natural ecological balance of such systems. Further, if stormwater and other run-offs can be effectively treated and recaptured as clean water, or at least as gray water, there is a potential that the recaptured water can help satisfy domestic needs for water.

There is also considerable interest in treating fluids for mining, agriculture, and industrial use. Besides the treatment and purification of water, the products separated from the fluid during treatment may be of value. For example, minerals in run-offs from mining or farms that contain high nutrient contents, various constituents of lubricants, and the like may be separated, collected, and reused or recycled. Further, the recovery of fluids or solids in industrial applications and from waste streams may be of interest.

U.S. Pat. No. 7,311,818 to Gurfinkel discusses an approach to a water separation unit having an inner and outer housing for storm water collection. Storm water enters the inner housing where water and debris are supposed to be separated. A series of hollow tubes connect the inner housing to the outer housing to allow liquid to pass into and collect in the outer housing and flow out of the unit through a network of discharge pipes. One problem with that approach is that the tubes can be clogged with debris. Another problem with that approach is that most of the silt and sand is not collected at the tube level in the inner housing; rather, it flows through the tubes and can be drawn into the discharge pipe and exit the outer housing. Yet another problem with that approach is that the unit must be completely drained before cleaning.

U.S. Pat. No. 7,846,327 to Happel, commercialized as the Nutrient Separating Baffle Box from Suntree Technologies, discusses an approach to a storm water filter box having a fixed basket to collect debris and a floatable skimmer to prevent floating debris that passed through the basket from leaving the box. The skimmer is positioned within the box between the inlet and the outlet and rises and falls with the water level in the box. Storm water is directed to pass through the basket to the skimmer where floating debris is collected. One problem with that approach is that moving parts that can break or jam are required for the skimmer to move. Another problem is that floating debris stays in contact with the wastewater, promoting decomposition of the debris.

U.S. Pat. No. 7,857,966 to Duran discusses an approach to a storm water inlet apparatus having inlet and outlet pipes on level with each other where wastewater flows directly through a catch basin. The apparatus includes a hood and skirted boom affixed to an interior wall of the basin over the outlet pipe. Wastewater flows beneath the hood and skirted boom and out through the outlet. In the process, heavier-than-water sediments sinks to the bottom of the basin while lighter-than-water debris floats on top of the wastewater in the basin. One problem with that approach is that a sealed hood prevents airflow, allowing a siphon to develop and pull the level of the wastewater down and potentially draw in the floating debris, thus reducing the performance of the apparatus. Also, the debris stays in contact with the wastewater, promoting decomposition of the debris.

U.S. Pat. No. 7,780,855 to Eberly discusses an approach to a system for storm water treatment. A treatment unit is connected to a control chamber through which fluid flows. The fluid is diverted via a control partition to an inlet pipe into the unit for treatment and returned through an outlet pipe. If the fluid flow exceeds the capacity of the inlet pipe, excess fluid flows over the control partition to the outlet of the control chamber. A problem with the approach is that it is not well-suited for a retrofit application due to the lack of significant grade between the inlet and outlet of the control chamber. Another problem with that approach is that there is no separation between different types of debris, i.e. biomass, hydrocarbons, silt and sand, etc.; everything is mixed in a potentially toxic soup.

U.S. patent Publication Ser. No. 10/430,170 to Peters et al. discusses a system for removing contaminants from storm water. Storm water flows through a process chamber comprising a series of vertical baffles that extend from the top, bottom, and sides of the chamber. Storm water flows through the chamber around the baffles, and debris is trapped along the bottom of the chamber and by filters placed in the gaps between the baffles and the chamber. One problem with that approach is that all filtration is done in the water; thus, debris stays in contact with the water promoting decomposition of the debris. A further problem with that approach is that all debris is collected at the bottom of the chamber, limiting the capacity of the chamber for collecting debris. Another problem with that approach is that the relatively small gaps between the baffles and the chamber may become easily clogged with debris.

There is further need for an efficient, cost-effective apparatus methods and systems for separating stormwater, operating fluids, lubricants, coolants, wastewater and the like to separate out solids, hydrocarbons, contaminants and pollutants, and recapture and recycle desired components.

SUMMARY OF THE INVENTION

Accordingly, the invention is directed to apparatus, methods and systems for treatment of stormwater and other fluids mixed with solids and liquids.

An objective of an embodiment of the invention is to provide an apparatus for the efficient separation of debris, biomass, silt, sand, hydrocarbons, and nutrient compounds from storm water. A further objective includes the effective separation of biomass from collected hazardous pollutants that results in the biomass being treated as ordinary garbage rather than hazardous waste.

Another objective of an embodiment of the invention is to provide a stormwater treatment apparatus that is self-contained, allowing for simple installation and maintenance. A further objective is to provide an apparatus that is compact, easily installed in a city street with existing drainage trunk line, and easily installed in a high water table area with shallow storm water systems.

Yet another objective of an embodiment of the invention is to provide a stormwater treatment system capable of diverting water off-line to avoid swamping a treatment unit in the event of overflow conditions. A further objective includes a system that will not reintroduce collected pollutants back into the storm drain system. A still further objective is to prevent bacteria, dead rodents, and other debris considered to be health hazards from backwashing and resurfacing on roadways and other property.

A further objective of an embodiment of the invention is to provide a fluid treatment apparatus and system for separating lubricants, cooling fluids, industrial fluids, agricultural fluids, mining fluids, and the like.

A still further objective of an embodiment of the invention is to provide a fluid treatment apparatus and system with no moving parts or filters.

A still further objective of an embodiment of the invention is to provide a system that requires no chemicals or additives of any kind.

Additional features and advantages of embodiments of the invention will be set forth in the description which follows, and will be apparent from the written description and claims hereof, as well as the appended drawings.

According to an aspect of an embodiment of the invention, a stormwater and fluid treatment unit comprises a separation container connected to an inlet and an outlet, a wall with an open top and bottom space within the container between the inlet and outlet, a wire mesh under the inlet, a drain pipe extending downward from the outlet, and a vent pipe connected to the outlet. According to another aspect of an embodiment of the invention, the drain pipe comprises a manifold. In a further aspect of an embodiment of the invention, the manifold comprises a pipe loop with an upper surface cut-out in the lower portion of the loop.

According to an aspect of an embodiment of the invention, a stormwater or fluid treatment unit separates stormwater or other fluids from debris by density relative to a main liquid. Fluid enters the unit from an inlet and flows into a pool of liquid, under a wall extending into the pool and out through an outlet at a level below the inlet. The unit includes a wire mesh beneath the inlet to collect large debris and a vent pipe connected to the outlet to avoid a vacuum condition in the outlet.

According to another aspect of an embodiment of the invention, a stormwater and fluid treatment system comprises two drainage flow chambers coupled via a drainage trunk line, a fluid treatment unit coupled to the two drainage flow chambers by an inlet pipe and an outlet pipe, respectively, and a baffle in the inlet drainage flow chamber extending no higher than the top of the inlet pipe.

According to an aspect of an embodiment of the invention, a stormwater and fluid treatment system effects an off-line diversion of stormwater or other fluids to a stormwater or fluid treatment unit from a drainage trunk line. A fluid treatment unit is coupled to two drainage flow chambers along the drainage trunk line via an inlet and an outlet, respectively. The inlet drainage flow chamber comprises a baffle that diverts a flow of fluid in the trunk line into the unit. If the unit reaches its capacity, the baffle allows the excess to flow through the existing trunk line.

According to a further aspect of an embodiment of the invention, a stormwater treatment system includes first and second flow chambers connected by a connecting drainage trunk line, an inlet drainage trunk line coupled to the first chamber, an outlet drainage trunk line coupled to the second chamber; a stormwater treatment unit coupled to the first chamber via an inlet pipe and to the second chamber via an outlet pipe, wherein the first chamber comprises a baffle that has a height no greater than a top of the inlet pipe at the first chamber. The stormwater treatment system may further comprise a backflow preventer; the inlet drainage trunk line, the connecting drainage trunk line, and the outlet drainage trunk line may have the same pitch; and the inlet drainage trunk line, the connecting drainage trunk line, and the outlet drainage trunk line may be collinear.

According to another aspect of an embodiment of the invention a method of retrofitting an existing fluid trunk line or stormwater trunk line includes the steps of replacing a first section of trunk line with a first chamber, replacing a second section of trunk line with a second chamber downstream and separated from the first chamber; and installing a fluid treatment unit coupled to the first chamber via an inlet pipe and to the second chamber via an outlet pipe; wherein the first chamber includes a baffle that has a height no greater than a top of the inlet pipe at the first chamber. A backflow preventer may also be installed at the outlet pipe or the second chamber. The fluid treatment unit may be a fluid treatment unit according to an embodiment of the invention, a stormwater treatment unit according to an embodiment of the invention or another fluid or stormwater treatment unit.

BRIEF DESCRIPTION

FIGS. 1A-C comprise a set of diagrams of a stormwater treatment unit according to an embodiment of the invention. FIG. 1A shows a top view of the unit. FIG. 1B shows a front view of the unit. FIG. 1C shows a side view of the unit.

FIG. 2 comprises a set of diagrams of a stormwater treatment system according to an embodiment of the invention. FIG. 2A shows a top view of the system. FIG. 2B shows a side view of the system.

FIG. 7 is a diagram of an alternate manifold for a fluid treatment unit according to an embodiment of the invention.

DETAILED DESCRIPTION OF THE PREFERRED EMBODIMENTS

Embodiments of the present invention are hereafter described in detail with reference to the accompanying figures and are provided for purposes of illustration only and not for the purpose of limiting the invention as defined by the appended claims and their equivalents. Descriptions of well-known functions and constructions are omitted for clarity and conciseness. The figures are meant to illustrate features of exemplary embodiments of the invention and are not drawn to scale.

Figure 1B:
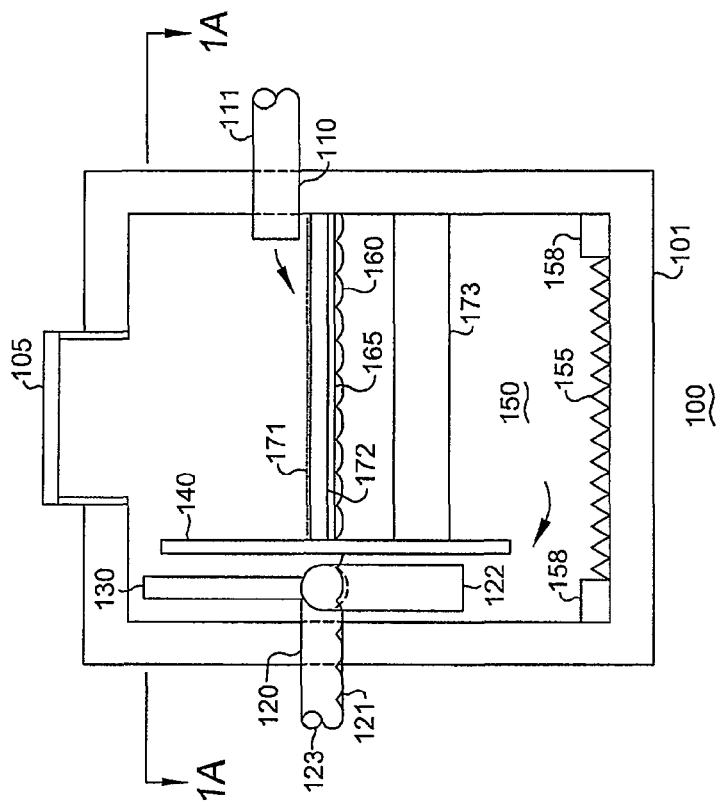
Figure 1A:
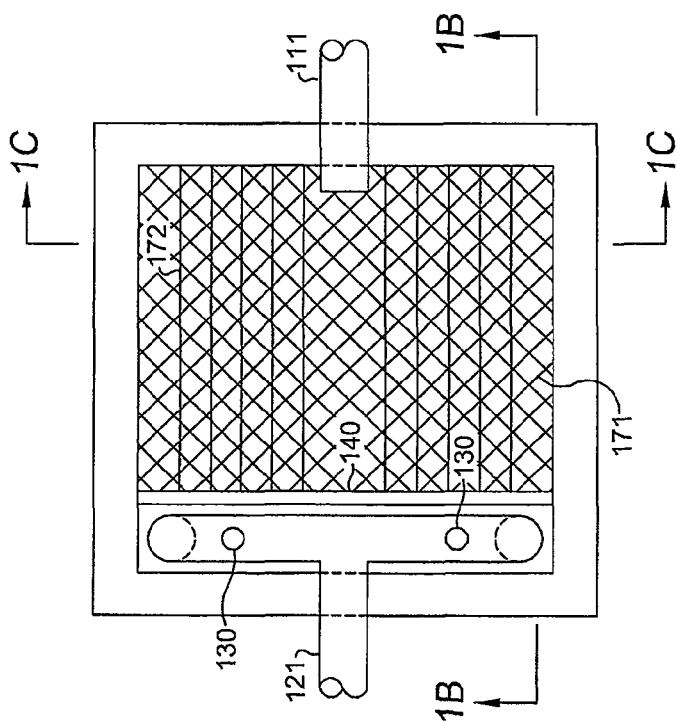
Figure 1C:
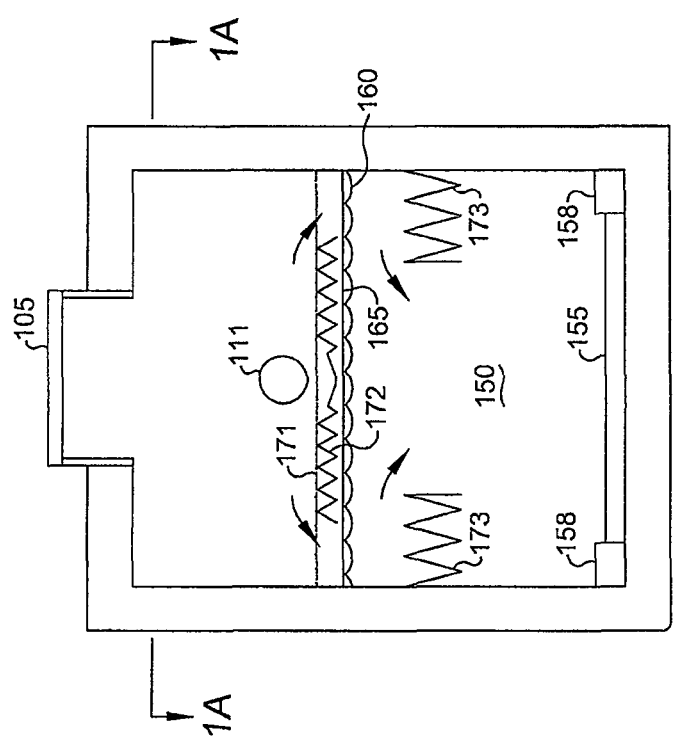

FIGS. 1A-C illustrate a stormwater treatment unit according to an embodiment of the invention. FIGS. 1A, 1B, and 1C show respective top, front, and side views of the unit.

Stormwater treatment unit 100 is housed in containment vault 101. Preferably, the dimension of the vault is 6' long×7' wide×8'4" tall, and the vault is made of liquid-impermeable concrete with walls that are 6" thick. The dimensions of the vault can be adjusted depending on the application and can be made of other suitable materials such as metal or plastic. The interior of the vault defines a chamber 150.

Containment vault 101 has three openings connecting to chamber 150: inlet 110, outlet 120, and access opening 105. Inlet 110 is placed on one side of chamber 150 and is preferably 12" in diameter and is fitted with a similarly sized pipe 111. Outlet 120 is placed on the opposite side of chamber 150 and is preferably 12" in diameter and is also fitted with a similarly sized pipe 121. Access opening 105, preferably in the form of a manhole, is preferably located at the top of vault 101 and is fitted with a cover. Preferably, materials for the pipes can be PVC, metal, or other types of materials suitable for use with the fluids and contaminants anticipated. Inlet 110, outlet 120, and the pipes 111 and 121 can be of other suitable sizes to accommodate different volumes of fluid and flow rates.

In a preferred embodiment, inlet 110 is positioned at about five inches higher than outlet 120. Inlet 110 and outlet 120 are thus very similar in height, allowing for a shallow installation of the unit in areas with a high water table that cannot support a large difference in height between inlet 110 and outlet 120.

Outlet pipe 121 extends through outlet 120 and bends downward toward the bottom of chamber 150 in vault 101. Inlet 122 of pipe 121 faces downward towards the bottom of chamber 150. Outlet pipe 121 is separated from chamber 150 by wall 140. Wall 140 preferably extends from above outlet 120 to a position midway between outlet 120 and the bottom of chamber 150 allowing liquid in chamber 150 to flow to pipe 121. The height of inlet 122 is at or above the lower end of wall 140. Optionally, portions of outlet pipe 121 below outlet 120 may be perforated to further diffuse the draw of liquid by allowing liquid to enter through the sides of pipe 121.

If the outlet 123 of pipe 121 extends lower than water level 160 (as is normally expected to allow flow through pipe 121), the flow of water in pipe 121 could create a siphon that would draw down the water level 160 in chamber 150 to the height of inlet 122 of outlet pipe 121. Vent pipe 130 connects to and extends upward from outlet pipe 121. Vent pipe 130 allows airflow into pipe 121 to avoid the creation of a siphon during high volume flows. Alternatively, pipe 121 could be perforated below water level 160 to allow airflow if water level 160 falls below the bottom of outlet 120 and reduce or avoid a siphon effect.

A space exists between the top of wall 140 and the top of chamber 150 to allow air flow near vent pipe 130 and to prevent the siphoning effect. Wall 140 further serves as a physical barrier to protect pipe 121 from the pressure of inlet water and debris flowing from inlet pipe 111. Wall 140 is preferably made of stainless steel, plastic, or other material suitable for use with the fluids and contaminants anticipated.

Wire mesh 171 is located beneath inlet pipe 111 and is preferably above the lowest part of the outlet 120. Due to the equalization of pressures, water level 160 should normally be at the level of the lowest part of outlet 120 as a higher water level should cause a flow out of outlet pipe 121. Wire mesh 171 is preferably located above water line 160 and separates out large debris from the inlet stream of stormwater. Wire mesh 171 is preferably a metal grate or wire mesh with suitably-sized holes to collect debris from the inlet fluid at the top of the wire mesh while allowing smaller debris, particles, and fluids to flow through. Wire mesh 171 collects leaves and other large clumps of biomass above the water level, and prevents the collected debris from soaking in the liquid in chamber 150 or floating at the water level 160. By keeping the biomass on wire mesh 171 out of the pool of water, the decomposition process for that biomass is slowed and the leaching of ammonium nitrate, other nitrates, and other components from the organic matter is reduced. By keeping trash and other larger debris on wire mesh 171 out of the pool of water, the leaching of chemicals, contaminants and pollutants into the water is reduced.

In the preferred mode of operation of stormwater treatment unit 100, inlet water flows into chamber 150 from inlet pipe 111 from the side, flows into the pool of water in chamber 150 and flows out of chamber 150 through outlet pipe 121. Preferably, chamber 150 is pre-filled with water to a level above inlet 122. The inlet water, which could be from stormwater, run-offs, or other sources, contains varying degrees of debris, biomass, and other solid, semisolid and particulate materials. These materials include heavier-than-water elements such as sand and metals and lighter-than-water elements such as plastics, grease, oil and other hydrocarbons. Stormwater treatment unit 100 works by separating elements in the contaminated water by density. As the inlet water flows through wire mesh 171, heavier elements settle as sediment to the bottom of chamber 150; lighter elements float on top of water line 160 as floating debris 165.

If oil, or other petroleum product, is introduced to the unit as part of floating debris 165, the oil acts as a cover reducing, if not eliminating, the flow of air (e.g., oxygen) into the collected fluid in the unit and, thus, retards the growth of bacteria, algae, and the like in the collected fluid. The reduction in such growth of microorganisms lengthens the maintenance cycle of the unit and reduces a health hazard for maintenance workers and the environment.

Due to the height of the lower end of wall 140, liquid from the midsection of chamber 150 is drawn into inlet 122. Due to the separation process, the liquid drawn into inlet 122 contains less of the lighter elements and heavier elements than the original stormwater. Preferably, wall 140 is positioned high enough to avoid pipe 121 drawing sediment (not shown) from the bottom of chamber 150.

In maintenance, stormwater treatment unit 100 is cleaned periodically depending on the capacity of the unit, volume of stormwater processed, and the contamination levels. Dried leaves, other biomass, and trash can be collected from wire mesh 171. Floating debris 165, such as oil and grease, can be skimmed from the surface of water level 160. Collected sediment can be vacuumed or otherwise removed from the bottom of chamber 150. Optionally, a vacuum can be used to collect other portions of the liquid in chamber 150. As such, the open and modular design of unit 100 keeps the unit accessible for easy maintenance and cleaning.

Referring to FIG. 1A, in an embodiment of the invention, outlet pipe 121 is preferably a manifold comprising of two or more pipes extending down into chamber 150. The pipes of the manifold can be placed such that they take a diffused draw from different locations of chamber 150. This arrangement helps in reducing collected sediments at the bottom of chamber 150 from drawing into pipe 121 and in evening the pattern of the collected sediment as compared to the use of a single centrally-located outlet pipe inlet. In another embodiment of the invention, a single centrally-located outlet pipe inlet is used.

In another embodiment of the invention, a deflector (not shown) is located beneath inlet pipe 111 and above wire mesh 171. Incoming storm water pours on to the deflector and is scattered. The deflector helps slow the inlet water pouring out of pipe 111 and prevents the inlet water from taking a deep plunge that would drive materials through wire mesh 171 and cause large turbulence that would disrupt the settling of sediment at the bottom of chamber 150. In another embodiment of the invention, the deflector may be a sprinkler board that diverts the flow of water and spreading the water throughout the length and width of the chamber. Numerous other water deflecting configurations attached to inlet pipe 111 or positioned in the stream of inlet water will be apparent to one of ordinary skill in the art.

In a preferred embodiment of the invention, collectors 172 and 173 are located beneath wire mesh 171. Collectors 172 and 173 are preferably made of stainless steel and shaped with grooves to present a saw tooth cross-section to slow the rush of the inlet water into chamber 150 and help collect sediment. Collectors 172 and 173 increase surface area contact with the inlet water and may be angled, textured, coated, magnetized or use other cross-sectional shapes, to collect certain materials. In a preferred embodiment, the grooves of collector 172 are four inches deep and the grooves of collectors 173 are twelve inches deep. Alternatively, collectors 172 and 173 may include a pattern of projections that induces turbulence to collect certain materials such as is used in mining operations. Collectors 172 and 173 could also be magnetized to collect certain metals. In a further embodiment of the invention (not shown), collectors 173 are placed above water line 160. In a still further embodiment of the invention, multiple levels of collectors 172 and 173 are used to cascade inlet water. The height of collectors 172 and 173 may be adjustable.

Optionally, collector 155 is located at the bottom of chamber 150 and collects sediment in a manner similar to that of collectors 172 and 173. Collector 155 is also preferably made of stainless steel and shaped with grooves to create a saw tooth cross-section. Collector 155 has increased surface area contact with the flowing fluid and may be angled, textured, coated, magnetized, or utilize other cross-sectional shapes to collect certain materials from the fluid. The grooves of collector 155 are preferably two inches deep.

Also optionally, filler blocks 158 are placed in the bottom corners of chamber 150. Filler blocks 158 shape the bottom of chamber 150 to help reduce turbulence in the water flow and further aid in the efficiency of collecting the sediments and increasing the distance between collected sediment at the bottom of chamber 150 and inlet 122.

In a further embodiment of the invention, the position or dimensions of wall 140 are adjustable to adjust the flow of water to inlet 122 and adjust the efficiency of the treatment process or extract water from different levels within chamber 150—i.e., closer to water level 160 versus closer to the bottom of chamber 150. In another embodiment of the invention, wall 140 is perforated to allow a selective extraction from different levels within chamber 150. In yet another embodiment of the invention (not shown), inlet 122 and vent pipe 130 are omitted, leaving outlet pipe 121 flush with the opening of outlet 120 to extract fluid from chamber 150 through the perforated wall. Different levels of fluid in chamber 150 may be extracted depending on the placement of perforations in the wall.

FIGS. 2A-B illustrate a stormwater treatment system according to another embodiment of the invention. FIG. 2A shows a top view and FIG. 2B shows a side view of the system.

Stormwater treatment system 200 can be built to modify an existing drainage trunk line with trunk line inlet 201 and trunk line outlet 202. In an exemplary embodiment, drainage flow chambers 280 and 290 and stormwater treatment unit 270 are added to the existing trunk line. The side view of the system shown in FIG. 2B does not show the existing trunk line for simplified illustration. System 200 has the advantage of off-trunk line operation that runs parallel to the existing drainage trunk line.

Chamber 280 includes baffle 281 which comprises a short angled wall for diverting flow from inlet 201 to connecting pipe 271. Connecting pipe 271 connects chamber 280 with treatment unit 270. Connecting pipe 272 connects treatment unit 270 with chamber 290. A conventional backflow preventer 291 is preferably provided in or near the junction of pipe 272 and chamber 290. Treatment unit 270 may have a conventional design or a design in accordance with the present invention (as shown).

In the operation of system 200, inlet water from trunk line inlet 201 is diverted via baffle 281 into pipe 271 and into stormwater treatment unit 270. The water is treated in unit 270 and returns to chamber 290 via pipe 272. The treated water flows from chamber 290 into trunk line outlet 202. Backflow preventer 291 reduces or prevents the return of outlet water to stormwater treatment unit 270 via outlet pipe 272.

In a preferred embodiment of the invention, chambers 280 and 290 are lined with collectors 282 and 292, respectively, at the bottom of the chambers. Collectors 282 and 292, similar to collectors 172, 173, and 155 in FIGS. 1A-C, are preferably made of stainless steel and shaped with grooves to present a saw tooth cross-section to collect sediment. Collectors 282 and 292 are preferably aligned with the saw tooth cross-section perpendicular to the flow of water, e.g., collinear with pipe 271 for collector 282 and with pipe 202 for collector 290, to maximize the collection of sediment. Collectors 282 and 292 may also be textured, coated, or magnetized or utilize other cross-sectional shapes to collect certain materials. The grooves of collectors 282 and 292 are preferably two inches deep.

Figure 3:
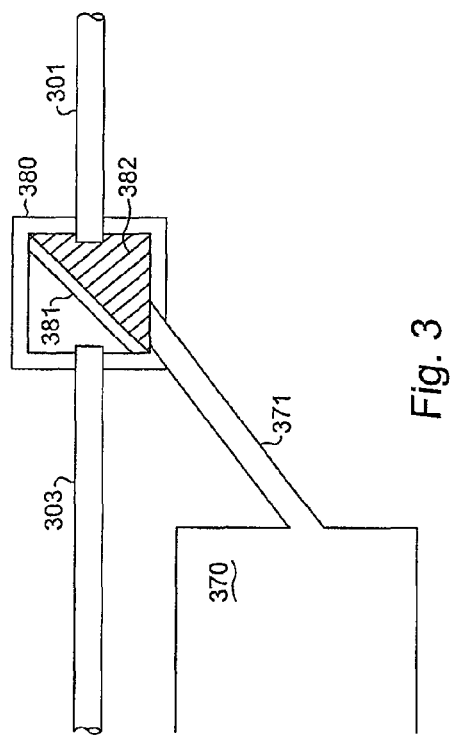
FIG. 3 is a diagram of an inlet drainage flow chamber for a stormwater treatment system according to an embodiment of the invention.

FIG. 3 illustrates an inlet drainage flow chamber for a stormwater treatment system according to an embodiment of the invention.

Drainage flow chamber 380 is connected to inlet 301 from an existing drainage trunk line, outlet 303 to an existing drainage pipeline, and pipe 371 to a stormwater treatment unit 370. Baffle 381 in chamber 380 diverts the ordinary flow of inlet water from inlet 301 to pipe 371 for water treatment. An overflow of inlet water passes over baffle 381 to outlet 303. Baffle 381 is preferably built with 6" thick concrete or concrete blocks, but may be built with other suitable materials with other dimensions. In a preferred embodiment, baffle 381 extends to a height no higher than the top of pipe 371 and collector 381 is positioned at the bottom of chamber 380.

In operation, as the inlet water enters drainage flow chamber 380 from inlet 301, the water is blocked off from outlet 303 by baffle 381 and is diverted to pipe 371 into a stormwater treatment unit 370 for treatment. If an overflow condition starts to build in stormwater treatment unit 370 causing the water level in pipe 371 to rise to the top of the pipe, the water level in chamber 380 rises to the top of baffle 381 and the excess inlet water flows over the top of baffle 381 into outlet 303 of the drainage trunk line. Effectively, chamber 380 with baffle 381 acts as an overflow prevention system for the unit 370. Preventing overflow in stormwater treatment unit 370 is an important aspect of the system because an overflow condition may cause debris, sediment, contaminants, pollutants and the like collected by the unit to be flushed out of the unit and back into the drainage system reducing, or entirely negating the unit's performance. Alternatively, in cases where an unexpected volume of stormwater flows through inlet 301 exceeding the capacity of pipe 371, the water level in chamber 380 will rise and the excess flow will pass over baffle 381 to outlet 303.

Figure 4:
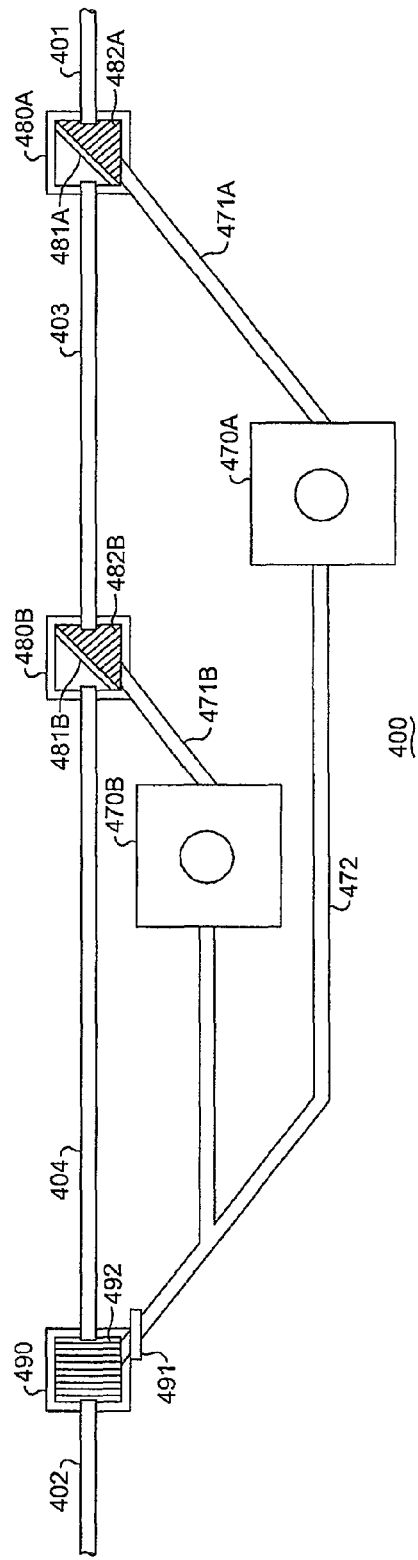
FIG. 4 is a diagram of a stormwater treatment system according to another embodiment of the invention.

FIG. 4 illustrates a stormwater treatment system according to another embodiment of the invention. Preferably, the system is used for heavy storm water flow. Additional units may be added as necessary.

Stormwater treatment system 400 comprises two off-line stormwater treatment units 470A and 470B arranged in a parallel configuration. Flow drainage chambers 480A is connected to trunk line inlet pipe 401 and, via pipe 403, to chamber 480B. Chamber 480B is connected via pipe 404 to chamber 490. Chamber 490 is connected to trunk line outlet pipe 402 of the existing drainage trunk line.

Flow drainage chambers 480A and 480B, with collectors 482A and 482B is positioned at the bottom of the chambers, respectively, divert water flow via baffles 481A and 481B, respectively, to pipes 471A and 471B, respectively. Pipes 471A and 471B connect to the inlets of stormwater treatment units 470A and 470B, respectively. The outlets of units 470A and 470B are connected to outlet pipe 472.

In operation, inlet water from inlet 401 is diverted by baffle 481A to pipe 471A to water treatment unit 470A. If an overflow condition occurs in chamber 480A, the excess inlet water overflows baffle 481A to pipe 403 and enters flow drainage chamber 480B. Baffle 481B diverts the inlet water into water treatment unit 470B. If an overflow condition occurs in chamber 480B, the excess inlet water overflows baffle 481B to pipe 404.

Treated water flows out of units 470A and 470B into pipe 472, through backflow preventer 491 and into chamber 490, includes collector 492 at the bottom of chamber 490. In an exemplary embodiment of the invention, pipe 472 is 18" in diameter. Backflow preventer 491 is a conventional backflow preventer to reduce or prevent water from flowing from chamber 490 into pipe 472. Optionally, the outlets of units 470A and 470B may also be equipped with backflow preventers.

While system 400 contains only two stormwater treatment units arranged in parallel, further units can be added and arranged in the configuration of unit 470B.

The stormwater treatment unit and system has advantageous application to other uses besides stormwater treatment. Filtering run-offs from mining operations, processing fluids used in oil well fracturing operations, recycling cooling fluids for cutting blades, processing contaminated lubricants containing metal shavings, and like applications may be implemented with the treatment units and systems according to the present invention.

Figure 5:
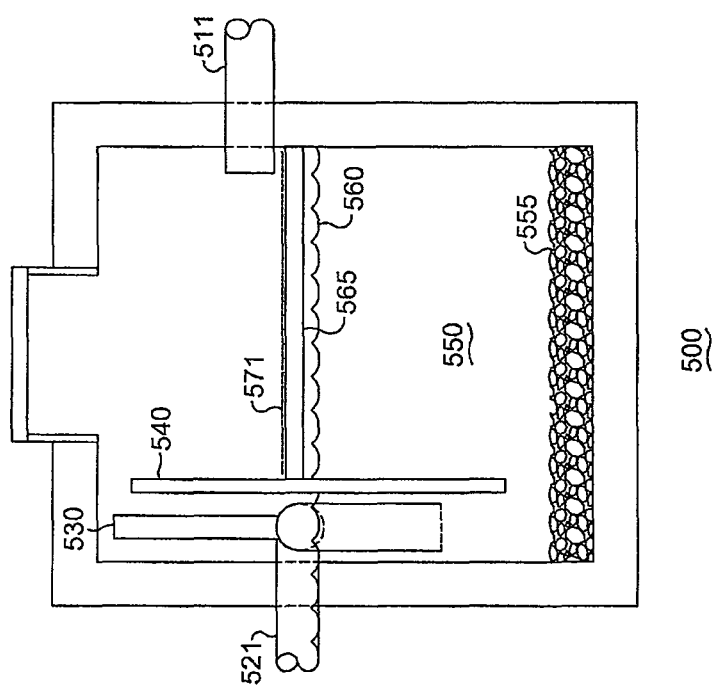
FIG. 5 is a diagram of a fluid treatment unit according to another embodiment of the invention.

FIG. 5 illustrates a front view of a fluid treatment unit 500 according to an embodiment of the invention.

Fluid treatment unit 500 comprises chamber 550, with openings for inlet 511 and outlet 521. Inlet 511 and outlet 521 are separated by wall 540 extending only part way between the top and bottom of chamber 550. The inlet fluid from inlet 511 is pre-separated by wire mesh 571 for larger debris. Vent pipe 530 is located on top of outlet 521 to facilitate the release of any pressure differential in outlet 521. In operation, fluid flowing through unit 500 is separated by density. Lighter components 565 float on top of the reservoir of principal fluid in chamber 550. Heavier components 555 settle and are collected at the bottom of chamber 550. Once the level of fluid 560 in chamber 550 reaches the lower level of pipe 521, processed fluid flows out of pipe 521.

Figure 6:
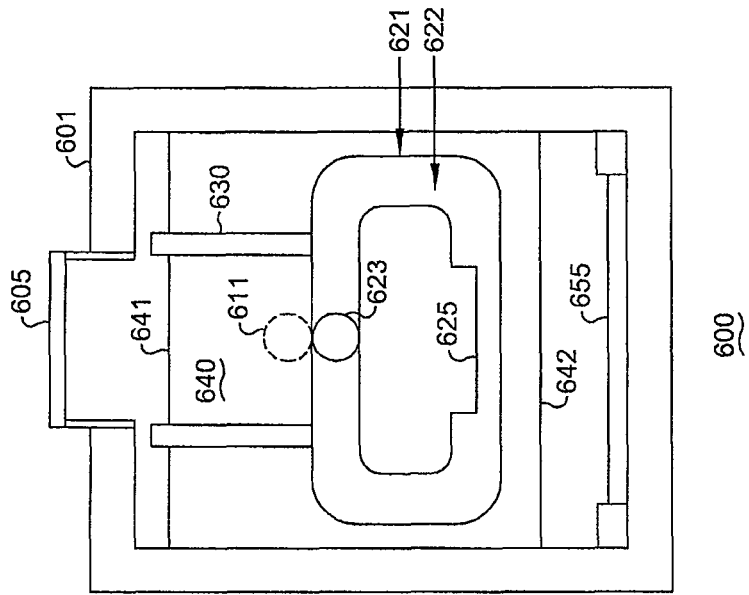
FIG. 6 is a diagram of a fluid treatment unit with an alternate manifold according to another embodiment of the invention.

FIG. 6 illustrates a side view of a fluid treatment unit 600 with an alternate outlet manifold 621 according to another embodiment of the invention. FIG. 7 illustrates a perspective view of alternate outlet manifold 621 according to an embodiment of the invention.

Fluid treatment unit 600 comprises a chamber defined by wall 601, sump area 655 for collecting debris at the bottom of the chamber, and access opening 605 at the top of the chamber. Inlet pipe 611 is located on one side of the chamber, and outlet manifold 621 with an outlet pipe 623 is located on another side of the chamber. Inlet pipe 611 and outlet pipe 623 are separated by a wall 640 in the chamber having a wall top 641 and a wall bottom 642.

A space exists between wall top 641 and the top of the chamber to allow airflow between the chamber and vent pipes 630. Another space exists between wall bottom 642 and the bottom of the chamber to allow fluid to flow from inlet pipe 611 to outlet manifold 621. Outlet manifold 621 comprises pipe loop 622 and vent pipes 630 and is connected to outlet pipe 623. Pipe loop 622 has a cut-out 625 at the top surface of a bottom portion of the loop.

In a preferred mode of operation, fluid flows into the chamber from inlet pipe 611 into a pool of fluid in the chamber normally at a level reaching the bottom surface of outlet pipe 623. Fluid in the pool flows underneath wall bottom 642 and enters outlet manifold 621 through cut-out 625, which is positioned lower than outlet pipe 623. Fluid that entered outlet manifold 621 through cut-out 625 rises in pipe loop 622 as the fluid level in the chamber rises, until it reaches the level of the bottom surface of outlet pipe 623 and flows out through outlet pipe 623. Only fluid entering outlet manifold 621 through cut-out 625 will be able to access outlet pipe 623. Outlet pipe 623 is positioned lower than inlet pipe 611 so that fluid can flow due to gravity from inlet pipe 611, through the chamber, into the outlet manifold 621 via cut-out 625, and out through outlet pipe 623.

Particles caught in the flow of fluid under wall bottom 642, or swept up from sump area 655, if any, may impact the bottom surface of the bottom portion of pipe loop 622. Such impact can prevent, or at least slow, the flow of such particles into cut-out 625.

Differences in air pressure between the chamber and pipe loop 622 are equalized due to the flow of air over wall top 641 and into vent pipes 630 or from vent pipes 630 over wall top 641 to the chamber.

According to an embodiment of the invention, a method of retrofitting an existing stormwater trunk line is disclosed. First, two separated sections of a trunk line are replaced with two chambers, the second chamber separate and downstream from the first chamber. Next, a stormwater treatment unit, either as disclosed in the present invention or known in the art, is connected to the two installed chambers via an inlet pipe connected to the first chamber and an outlet pipe connected to the second chamber. A baffle is installed in the first chamber with a height no greater than the top of the inlet pipe in the first chamber to direct flow into the inlet pipe. In another embodiment of the invention, a backflow preventer is installed between the outlet pipe and the second chamber.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A fluid treatment apparatus for treating an inlet fluid, comprising:
   a separation container connected to an inlet pipe and to an outlet pipe wherein said outlet pipe is at a position lower in said container than said inlet pipe;
   a wall within said container between said inlet pipe and said outlet pipe;
   said wall defining a top space between a top of said wall and a top interior surface of said container;
   said wall defining a bottom space between a bottom of said wall and a bottom interior surface of said container;
   a first grooved collector within said container and located under said inlet pipe;
   a second grooved collector within said container and located at a lower level than said first collector;
   a drain pipe extending downward from said outlet pipe; and
   a vent pipe extending upward from said outlet pipe.

2. The fluid treatment apparatus of claim 1, further comprising an access opening at the top of said separation container.

3. The fluid treatment apparatus of claim 1, wherein said wall extends substantially half of the distance between said lower surface of said outlet pipe and said bottom interior surface of said container.

4. The fluid treatment apparatus of claim 3, wherein said wall is adjacent said outlet pipe.

5. The fluid treatment apparatus of claim 1, further comprising a wire mesh above said first collector, wherein said wire mesh is configured to catch debris in said inlet fluid.

6. The fluid treatment apparatus of claim 1, further comprising a third collector within said container at said lower level and apart from said second collector.

7. The fluid treatment apparatus of claim 6, wherein the collectors are configured to allow said inlet fluid to cascade down from said first collector to the second and third collectors.

8. The fluid treatment apparatus of claim 1, wherein the collectors are configured to allow said inlet fluid to cascade down from said first collector to said second collector.

9. The fluid treatment apparatus of claim 1, wherein said drain pipe is perforated.

10. The fluid treatment apparatus of claim 1, wherein said apparatus is a stormwater treatment apparatus and said inlet fluid is stormwater comprising water and at least one of biomass, trash, oil, grease, silt, and sand.

11. The fluid treatment apparatus of claim 1, wherein said drain pipe comprises a pipe loop, wherein a plane defined by the pipe loop is vertically oriented.

12. The fluid treatment apparatus of claim 11, wherein said pipe loop comprises a bottom portion with a cut-out at a top surface.

13. The fluid treatment apparatus of claim 1, wherein the grooved collectors each present a saw-toothed cross section.

14. An in-ground water treatment apparatus for treating polluted stormwater, comprising:
   an in-ground separation container connected to an inlet pipe and to an outlet pipe wherein said outlet pipe is at a position lower in said container than said inlet pipe;
   a wall within said container between said inlet pipe and said outlet pipe;
   said wall defining a top space between a top of said wall and a top interior surface of said container;
   said wall defining a bottom space between a bottom of said wall and a bottom interior surface of said container;
   a first grooved collector within said container and located under said inlet pipe;
   a second grooved collector within said container and located at a lower level than said first collector;
   a drain pipe extending downward from said outlet pipe; and
   a vent pipe extending upward from said outlet pipe,
   wherein the apparatus is configured to allow the polluted stormwater to flow down from said inlet pipe, across at least a portion of said first collector, and down from said first collector to said second collector to collect a pollutant from the polluted stormwater in at least one of said first collector and said second collector.

15. The in-ground water treatment apparatus of claim 14, further comprising an access opening at the top of said separation container.

16. The in-ground water treatment apparatus of claim 14, wherein said wall extends substantially half of the distance between said lower surface of said outlet pipe and said bottom interior surface of said container.

17. The in-ground water treatment apparatus of claim 16, wherein said wall is adjacent said outlet pipe.

18. The in-ground water treatment apparatus of claim 14, further comprising a wire mesh above said first collector, wherein said wire mesh is configured to catch debris in the polluted stormwater.

19. The in-ground water treatment apparatus of claim 14, further comprising a third collector within said container at said lower level and apart from said second collector.

20. The in-ground water treatment apparatus of claim 19, wherein the collectors are configured to allow the polluted stormwater to cascade down from said first collector to the second and third collectors.

21. The in-ground water treatment apparatus of claim 14, wherein the collectors are configured to allow the polluted stormwater to cascade down from said first collector to said second collector.

22. The in-ground water treatment apparatus of claim 14, wherein said drain pipe is perforated.

23. The in-ground water treatment apparatus of claim 14, wherein the polluted stormwater comprises water and at least one of biomass, trash, oil, grease, silt, and sand.

24. The in-ground water treatment apparatus of claim 14, wherein said drain pipe comprises a pipe loop, wherein a plane defined by the pipe loop is vertically oriented.

25. The in-ground water treatment apparatus of claim 24, wherein said pipe loop comprises a bottom portion with a cut-out at a top surface.

26. The in-ground water treatment apparatus of claim 14, wherein the grooved collectors each present a saw-toothed cross section.

* * * * *